(No Model.)
F. W. O. NORTH.
PLUMBER'S PLUG.
No. 596,612.  Patented Jan. 4, 1898.
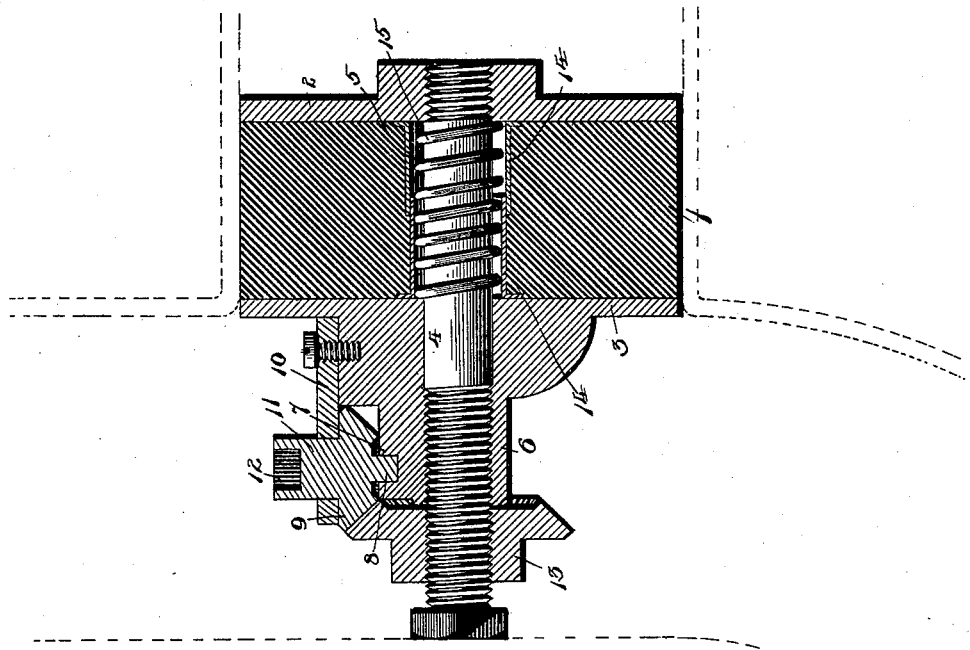
WITNESSES
INVENTOR
Frederick W. O. North
By John Hedderburn
Attorney

UNITED STATES PATENT OFFICE.

FREDRICK W. O. NORTH, OF BOSTON, MASSACHUSETTS.

PLUMBER'S PLUG.

SPECIFICATION forming part of Letters Patent No. 596,612, dated January 4, 1898.

Application filed September 17, 1896. Serial No. 606,110. (No model.)

*To all whom it may concern:*

Be it known that I, FREDRICK W. O. NORTH, a citizen of the United States, residing at Boston, in the county of Suffolk and State of Massachusetts, have invented certain new and useful Improvements in Plumbers' Plugs; and I do hereby declare the following to be a full, clear, and exact description of the invention, such as will enable others skilled in the art to which it appertains to make and use the same.

This invention has reference to a novel construction in a plug for sealing pipes, and is adapted more especially for plumbers' use for plugging up the end of a trap for the purpose of testing the joints of the pipes.

The accompanying drawing is a longitudinal section of my invention in place within a pipe.

Referring to said drawing, 1 indicates a rubber or flexible plug having an opening through the center thereof. On the opposite side of this plug 1 are two plates 2 and 3, the plate 2 being rigidly secured to the end of a spindle 4, passing through the opening 5 through the plug 1. The spindle 4 extends some distance on the other side of the plug and carries a plate 3. This plate 3 is provided with a sleeve 6, extending away from the plug 1, and is also provided with a saddle 7 to receive trunnions 8 of a beveled gear-wheel 9 and is held in place by another plate 10, removably secured to the saddle 7 and embracing the rear trunnion 11 of this gear-wheel 9. This rear trunnion 11 is provided with an opening 12 for the reception of a suitable tool whereby it may be turned.

The outer end portion of the spindle 4 is screw-threaded, and an interiorly-screw-threaded beveled gear-wheel 13 is mounted upon this spindle with its inner face abutting the end of the sleeve 6. This beveled gear-wheel 13 intermeshes with the beveled gear-wheel 9, and the plate 3 is free to move upon the spindle.

Within the plug 2 and surrounding the spindle are two collars 14, whose inner ends overlap, so that they can move longitudinally. A little space is left between these collars 14 and the spindle, within which a spiral spring 5 is situated to keep the collars and rubber plug free and away from the iron spindle, so that the rubber plug can always freely contract and expand.

In use when it is desired to close up a pipe the plug is inserted therein, it being supposed that the pipe to be plugged up is larger, and then by turning the beveled gear-wheel 9 the gear 13 is also turned, which acts as a nut and advances upon the screw-threaded portion of the spindle, and consequently forces the plate 3 against the rubber plug. By reason of the contact between the said gear-wheel 13 and the end of the sleeve 6 on the plate 3 sufficient force is applied to force together the ends of the plug and expand it laterally, which will make a tight joint, as will be obvious.

Having thus described my invention, what I claim as new, and desire to secure by Letters Patent, is—

1. The combination with a spindle, of a flexible plug carried thereby and situated between stationary and movable plates carried by said spindle, a screw-threaded end portion of said spindle, a nut upon said screw-threaded portion adapted to engage said movable plate, and gearing between said movable plate and said nut for turning the latter.

2. The combination with a spindle having a screw-threaded portion, of a flexible plug situated between stationary and movable plates, a bevel gear-wheel carried by said movable plate, and a nut upon said screw-threaded portion of the spindle and having a bevel gear-wheel intermeshing with the bevel gear-wheel of said movable plate.

3. The combination with a screw-threaded spindle, of a flexible plug situated between a stationary and movable plate carried by said spindle, said movable plate being provided with a sleeve extending away from said plug, a bevel gear-wheel mounted upon said sleeve and held in place by the plate 10 secured to said movable plate, and a nut upon said screw-threaded portion of the spindle having bevel gear-teeth intermeshing with said bevel gear-wheel and adapted to abut against the end of said sleeve.

4. The combination with a spindle, of a stationary plate rigidly secured to one end thereof, a movable plate upon said spindle, a flexible plug situated between said movable and stationary plates, devices carried by said movable plate for engaging the spindle and forcing said movable plates toward the stationary plate whereby said plug is expanded beyond the peripheries of the stationary and movable plates, said plug extending inwardly to a point adjacent the said spindle, two collars situated within the opening in said plug and separate from said stationary and movable plates and having overlapping inner ends, the outer ends of said collars being flanged so that they rest against the outer faces of said plug, while the interior diameter of the collars is larger than said spindle so as to leave a space between said parts, and a spiral spring inserted in said spindle, and situated between the spindle and said collars and bearing at its ends against said movable and stationary plates.

In testimony whereof I have signed this specification in the presence of two subscribing witnesses.

FREDRICK W. O. NORTH.

Witnesses:
   CHARLES A. STICKNEY,
   HENRY N. PAINE, Jr.